United States Patent Office 3,382,314
Patented May 7, 1968

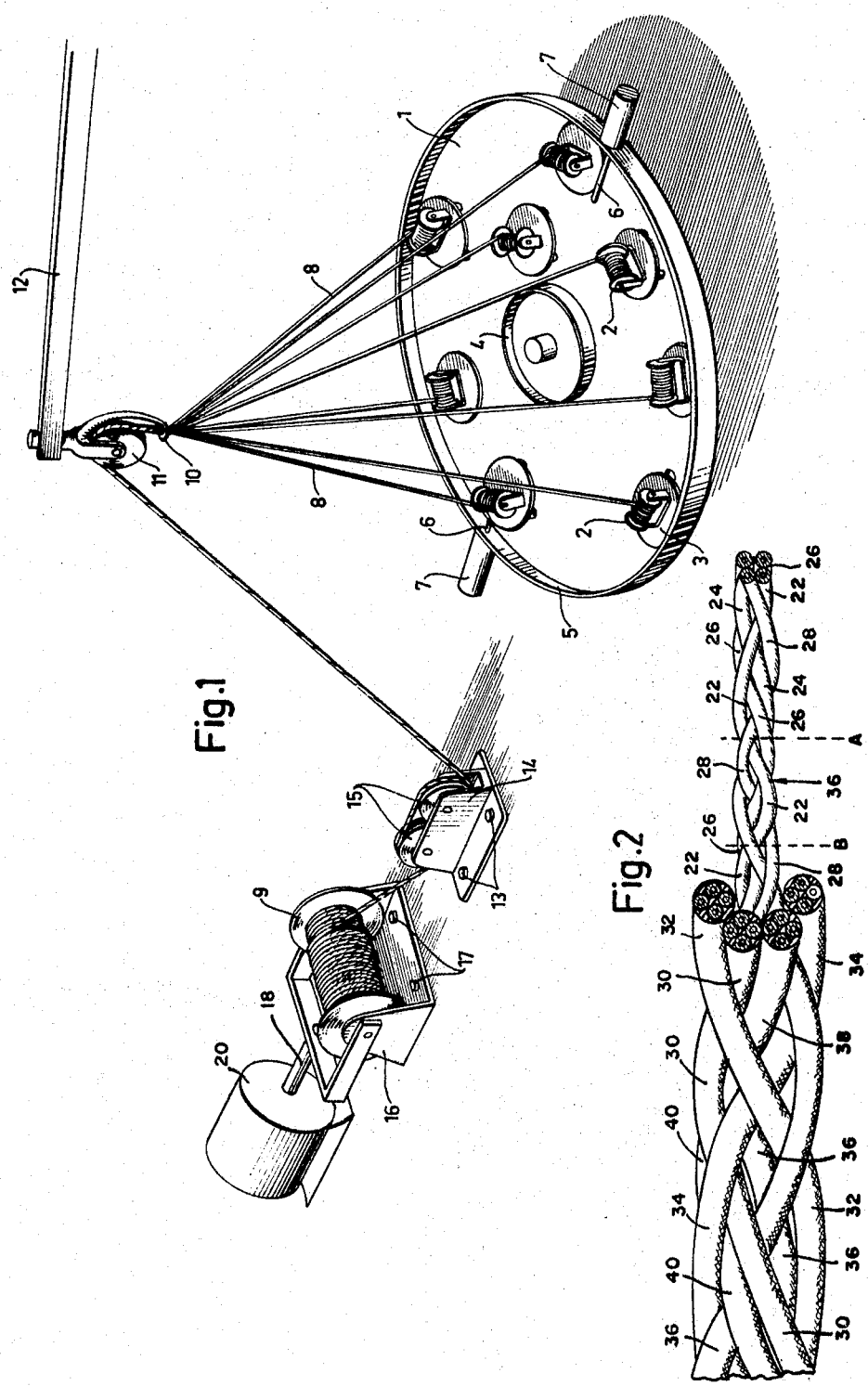

---

3,382,314
ELECTRIC LINE, PARTICULARLY FOR USE IN TELECOMMUNICATION SYSTEMS, AND A METHOD OF MANUFACTURING SUCH AN ELECTRIC LINE
Sven S. Nordblad, Spanga, Sweden, assignor to Telefonaktiebolaget L M Ericsson, Stockholm, Sweden, a corporation of Sweden
Continuation-in-part of application Ser. No. 344,469, Feb. 12, 1964. This application June 21, 1966, Ser. No. 563,012
Claims priority, application Sweden, Feb. 15, 1963, 1,677/63
23 Claims. (Cl. 174—34)

ABSTRACT OF THE DISCLOSURE

An electric line, particularly suitable for use in telecommunication systems, and a method of manufacturing such an electric line, including, randomly mixing at least three conductors, usually three pairs in telecommunication work, within a single group of conductors, or three groups of conductors within a single line or cable, or both the individual conductors of the groups and the groups of conductors within the cable, while combining the same, by twisting, plaiting, etc., to produce a group of combined conductors and/or a cable of combined groups of conductors in which the position of each conductor and/or group of conductors varies essentially at random over at least a substantial length of the group and/or cable with respect to all other conductors in the groups and all other groups in the cable. An illustrative method of randomly mixing the conductors is illustrated which includes drawing each individual line from a separate spool mounted on a freely moveable platform and moving the platforms randomly with respect to each other as the lines are being combined through a gathering eyelet. After passing through a gathering eyelet. After passing through the gathering eyelet, the lines may be twisted and thereafter wound on a drum.

---

The application is a continuation-in-part of application Ser. No. 344,469 filed Feb. 12, 1964, now abandoned.

This invention relates to an electric line of the kind particularly adapted for use in telecommunication systems and comprising a plurality of insulated conductors arranged in one or more groups. The expression "electric line" is used herein in its most extensive sense. Thus, it includes, inter alia, underground cables, aerial cables, strands of such cables, groups of conductors etc. The invention also relates to a method of manufacturing such an electric line.

For the transmission of telecommunication signals on a cable it has been preferred to use substantially symmetrical circuits. The most simple embodiment of such a cable is a cable wherein each group of conductors comprises only two conductors, i.e. a pair. Both conductors of the pair are then arranged so as to have identical characteristics with respect to the ambient, for instance with respect to earth, their cable sheath, if any, and adjacent pairs within the cable. In order to achieve such characteristics both conductors must not only have equal conductor diameters but must also be provided with insulating layers which are geometrically and electrically equal. Moreover, in such a cable the conductors within each pair are twisted, on the one hand to form an integral unit, and on the other, to assure that voltages and currents, respectively, which are induced in the two conductors by parasitic electric and magnetic fields, will have the same magnitude and the same direction in both conductors so that there will be no net interfering current or voltage within the pair. In order to eliminate the risk of interference phenomena between different pairs in a cable generally known as "cross-talk," the twist pitch has to be different from one pair to another, at least as far as adjacent pairs are concerned.

A signal transmitted by a pair of conductors is successively damped along the length of the cable. The degree of damping depends, of course, primarily upon the resistance of the conductors but also upon the capacitance between the conductors which is a function of the distance between the conductors. Thus, conductors which are tightly packed together will exhibit a higher damping than those which are more spaced. Considering a given cable cross-section, a lower damping can be achieved in each pair by combining the conductors into groups in a particular manner. Thus, instead of arranging the conductors in groups of two conductors each it has been proposed to combine the conductors into groups each containing four conductors.

The most simple embodiment of such a group consisting of four conductors is the "star quad." In such a quad the risk of interference between the two pairs is reduced because each pair is composed of diagonally opposite conductors. The electric and magnetic fields generated by the currents flowing through the one pair do not cause any net induced interference current in the other pair.

Beyond the lower damping in a cable consisting of a number of star quads as compared with a cable composed of a number of pairs of twisted conductors and having the same cross-section, a cable of star quads also permits a still better utilization of the available space and of the total number of conductors within the cable. Thus, it has been found that a quad also presents a third circuit, generally called "phantom circuit," the one part of which is constituted by the two conductors in the one pair and the other pair of which is formed by the two conductors in the other pair. Since the use of phantom circuits is well known within the art there is no need for any detailed description thereof in this connection.

As mentioned above, the degree of damping also depends upon the capacitance within the respective pairs. It has been observed that there is a definite relationship between the capacitance of each pair and the capacitance of the phantom circuit in a star quad. Particularly when using coil loading, the damping in a phantom circuit will be considerably higher than the damping in the pair circuits for transmission within the same frequency band. This is a serious drawback, since in most cases it is, of course, desired to obtain the same damping in all circuits within the cable. As above explained it is possible to avoid or eliminate, respectively, any interference caused by outer fields or by fields from adjacent circuits within the same cable by using twisted pairs and star quads, etc. However, this is true only in strictly ideal cases. Thus, in practice it is never possible to obtain complete symmetry. In particular, it has been found very difficult to attain a low interference level between the phantom circuit and the pair circuits within a star quad. This fact together with the fact that the damping in the phantom circuit is comparatively high in proportion to the damping in the pair circuits, has led to a very restricted use of the phantom circuit in the star quad.

There is also another well-known type of quad, generally called the "double pair." This quad consists of two separately twisted pairs of conductors which in turn are twisted together. In this quad each pair has a twist pitch which is different from that of the other pair as well as from the twist pitch of the quad and which also differs from the twist pitch of at least the adjacent pairs and quads. It has been found that the damping level in a quad of this type is less than that of the star quad. However, in the double pair quad the damping in the phantom circuit is somewhat lower than the damping in the pair circuits. This fact does, in combination with the more favorable cross-talk values in a quad of this type, explain why out of the two above-mentioned quad types the double pair quad has found the widest use in connection with phantom circuit utilization. Beyond the quad types above described also some variants have been proposed which have, however, never found any extensive use.

In order to eliminate the difficulties in suppressing cross-talk between different pairs encountered in connection with the manufacture of cables containing a number of pairs or quads or a number of strands, respectively, it has been proposed to twist the conductors intended to form a pair, a quad or a strand, respectively, in such a way that the twist pitch will, at least within a predetermined range, vary at random along the length of the line. In, for instance, a strand manufactured in this way pairs or quads which are located adjacent each other at one point along the cable will also lie adjacent each other at all other points along the cable. Therefore, the risk of cross-talk between adjacent pairs or quads is high also in cables of this kind.

The present invention has for its object to provide an electric line which does not exhibit the different drawbacks of the above-mentioned prior art types of electric lines. An electric line according to this invention is characterized in that the relative position of each one of at least three conductors within a group of conductors varies essentially at random with respect to all other conductors of such group along a substantial length of such group, and/or the relative position of each one of at least three groups of conductors within a line varies essentially at random with respect to all other groups of conductors of such line along a substantial length of such line.

In an electric line having, in accordance with the invention, groups of conductors plaited together at random the capacitances between different conductors within each such group will have the same value whereby all conductors within the group are completely equivalent with respect to all other conductors. Thus, to form a pair, it is possible to select any two conductors within a group. Considering the case when four conductors form two pairs there are three different ways of combining the conductors into those two pairs. If the conductors within said group are represented by the capitals A, B, C and D, one pair can comprise the conductors A and B, or A and C, or A and D while the other pair contains the conductors C and D, or B and D, or B and C, respectively. One of the advantages of a conductor group of this kind, in which the conductors can be combined into pairs in three different ways, is the increased possibilities of selecting a pair having the lowest cross-talk or being best suited for connection to another line in order to reduce the total cross-talk. The groups or quads previously known do not permit such a selection. In the present invention, the probability of finding in the other line a cross-talk value of the same magnitude but of opposite polarity is three times as high as in said known types of conductor groups. The possibility of obtaining a line system having very low cross-talk values is therefore correspondingly greater. It should be noted that the most severe cross-talk, namely that between the phantom circuit and the pair circuits is very low in a line made in accordance with the invention.

A further advantage of the line according to the invention is that the difference in damping between each of the pair circuits and the phantom circuits is comparatively low. In a cable comprising conductor groups, the relative positions of which vary at random along the cable length, all groups will have essentially equivalent characteristics, for instance with respect to the cable sheath, but also with respect to the other components of the cable. Moreover, the inter-group cross-talk is reduced because of the fact that the groups are not located close to each other along the entire cable length. This cannot be achieved when the groups are arranged in concentric layers as in previously known cables.

It should also be added that the invention permits the use of any desired number of conductors within each group. In the automatic exchange field there is, for instance, often a need for conductor groups comprising a talking circuit, consisting of one pair of conductors, and one or more conductors for controlling relays. In such cases the relay control currents can be returned through, for instance, earth without involving any risk for interference in the talk. Naturally, a cable according to the invention can also contain one or more conventional quads or pairs or a number of coaxial lines, for instance forming a core around which a number of conductor groups constructed in accordance with the invention are arranged.

When the inventive idea is applied in the construction of strand cables the different strands can, of course, be constituted by conductor groups built up in accordance with the invention or by conventional pairs or quads or by conventional conductor groups in combination with groups made in accordance with the invention.

As mentioned above, the invention also relates to a method of manufacturing an electric line of the kind above described, wherein at least three insulated conductors or groups of such conductors, respectively, stored upon bobbins, are wound off from said bobbins and combined into a bundle wound up on a collector drum. This method is characterized primarily by using bobbins carried by carriages or corresponding means and by causing said means to move essentially at random relative to each other.

In accordance with the invention the bundled conductors and/or groups of conductors, respectively, can be twisted around the longitudinal axis of the bundle in connection with the winding-up of the bundle on the collector drum.

An arrangement for carrying out the method according to the invention will now be described with reference to the accompanying drawing on which FIGURE 1 shows a perspective view of such an arrangement; and FIGURE 2 a group of conductors manufactured by the arrangement according to FIGURE 1, and a cable of groups of conductors manufactured by the arrangement according to FIGURE 1.

As appears from the drawing, said arrangement includes a circular platform 1 mounted for rotation around an axis perpendicular thereto. This axis forms a certain angle with the vertical plane whereby the platform will be inclined. The inclination of said axis and, consequently, the inclination of the platform can be either constant or variable at random within a predetermined range. The conductors or groups of conductors, respectively, to be combined into an electric line are each carried by a bobbin 2. Each of said bobbins is supported by a carriage 3 freely movable on the platform. In order to make it possible for said carriages to move at random they are provided with wheels in the shape of link rollers. Further, the platform is provided with an inner and an outer circular border 4 and 5, respectively, confining between them the motion area of the carriages. The radial distance between said borders is chosen so as to make it possible for the carriages to pass each other.

The carriages 3, which preferably may have a circular shape, tend to follow the rotational movement of the platform. When they have arrived at the highest portion of the platform they will move entirely at random downwards to the lowest portion of the platform whereupon they are again carried to the highest portion thereof. In order to increase the jumbling of the carriages the arrangement can be provided with one or more rods 6, which are caused to project into the motion area of the carriages at time intervals varying at random, said rods 6 being operated, for instance, by electromagnets 7. The rods 6 may be located at the outer and/or the inner border as well as at any position between said borders. Preferably, the rods are arranged so as to cause no disturbance in the carriage movement when in retracted positions.

Before reaching the collector drum 9 the conductors 8 wound off the bobbins 2 will have to pass through one collector ring 10 and over a pulley wheel 11, both carried by a beam 12.

In front of the collector drum 9 means may be provided for advancing the cable at a predetermined rate and/or for applying further insulating layers or a sheath to the line. In the embodiment illustrated on the drawing these means are constituted by two double-grooved pulleys 15 around which the line formed by the conductors 8 passes before reaching the collector drum 9. Said pulleys 15 are journalled in a bracket 14 which by means of bolts 13 is secured to a base. The collector drum 9 is rotatably mounted in another bracket 16 firmly attached to said base by means of bolts 17. The means required for driving the collector drum 9 and said pulleys 15 may be of any suitable kind, and consequently they have not been illustrated on the drawing.

During the manufacture of an electric line in the arrangement above described the line is twisted due to the rotation of the platform. However, it is also possible to twist the line by turning the collector bracket 16 on shaft 18 by a suitable drive means, such as, motor 20. This of course would require removal of bolts 17. This twisting of the line will make it more firm and rigid.

As appears from FIGURE 2, a line manufactured by an arrangement according to FIGURE 1 will consist of four intimately plaited conductors 22, 24, 26 and 28, respectively, the relative position of each conductor with respect to all other conductors varying at random from point to point along the length of the line and a line made up of six plaited groups of conductors, 30, 32, 34, 36, 38 and 40, respectively. For example, conductors 22 and 28 are adjacent one another where the cross section of the group is taken but, as one progresses from right to left along the group, the lines separate varying distances, cross over again at position A, separate again, cross over a second time at position B, and then separate again. The same applies with respect to the groups which form the final line or cable. Specifically, in going from right to left in FIGURE 2, groups 30 and 32 are adjacent one another at the right end of the cable section, then separate by varying distances and finally cross over again at the left end of the cable section. Therefore, viewing a plurality of cross sections of the group of conductors, or the cable made up of a number of groups, as one progresses over a substantial length of the group or cable, any given conductor within a group or any given group within a cable is randomly spaced from all other conductors within its group or all other groups within the cable.

An alternative arrangement which can be used for the manufacture of a line according to the invention will now be briefly described.

Each one of the carriages supporting the bobbins can be provided with an electric motor to which current is supplied, for instance, through the conductor stored upon said bobbin and through the wheels of the carriage which in such case do, of course, consist of electrically conductive material. Also, the surface on which the carriages move consists of such a material. Preferably, each carriage is provided with three wheels two of which have fixed axes while that of the third wheel is mounted for turning movement. Further, the carriages, which preferably have a rectangular or square shape, are provided with rails extending along the sides thereof. Two oppositely located rails act upon a switching device by means of which the direction of rotation of the motor is determined while the two other rails act upon said third wheel. The bearing surface may be horizontal and unmovable and provided with an outer border only. When a carriage strikes another carriage or the border an alteration of the direction of rotation of the motor or of the angular position of said "steerable" wheel will take place. The carriages will consequently move around entirely at random.

Naturally, the two arrangements above described may be combined in any suitable manner. For instance, the arrangement last described may be provided with a bearing surface constituted by a rotatable platform.

The apparatus of FIGURE 1 may be modified in various other ways. For example, bobbins 2 may be mounted with their axis in an upright position and they may be either rotatably or non-rotatably mounted on their carriages 3. Further, inner border 4 can be omitted, if desired. It is also possible to vary the configuration of platform 1 and outer border 5 to provide a square, a triangle, etc., rather than a circle. Still further, either platform 1 or border 5 can be irregular, for example, undulated in a repetitive or non-repetitive manner. Other modifications and variations will occur to one skilled in the art, which will not depart from the principal purpose of randomly combining the lines 8.

In the manufacture of a line or a group of conductors according to the invention it may be found advisable, in some cases, to entervene in the random movements of the carriages in order to compensate for any unbalance in the electrical characteristics of the line which may arise due to imperfections in the arrangement causing deviations from the purely random distribution of the conductors.

By way of example, one may continuously or intermittently supervise the electrical characteristics of a group or cable during the manufacture of the group or cable. Such supervision can be accomplished by intermittently or continuously measuring an electrical characteristic, such as capacitance, and noting any deviation in such characteristic from its normal value. When such a deviation is noted two or more conductors or groups can be maintained in fixed relative positions with respect to each other for a period of time necessary to correct the unbalance. This interference may be affected by holding the two or more lines or groups in intimate side-by-side relation for the required period or by holding the lines or groups in fixed, spaced relationship for the required time. It is also to be recognized that the two or more lines or groups whose random combination is interrupted need not necessarily be the lines or groups on which the unbalance was detected. Unbalanced capacitances, inductances, or other electrical characteristics, which may in turn cause increased cross-talk, may also be measured and supervised as indicated or in any other suitable manner.

In summing up, the following specific advantages should be mentioned for a group made up of a plurality of conductors or a line made up of a plurality of groups or conductors wherein the relative radial positions of the conductors, the groups or both vary at random.

No conductors or groups of conductors will lie adjacent each other along any great total distance. Hereby the cross-talk between different conductors or groups is effectively reduced. Of course, a line or cable made in accordance with the invention will not be subjected to any risk of cross-talk caused by an improper choice of the twist pitches since there does not exist any definite twist pitch in such a line. The selection of different conductors to form any desired circuit may be carried out in a number of different ways.

No conductors or groups of conductors will be particularly influenced by sheath currents but such interference will be equally distributed between all circuits and thereby reduced.

The deviation in capacity in a line according to the invention is considerably less than in the previously known line types because of the fact that in the former case all conductors or groups of conductors, respectively, are entirely equivalent.

In a group or line designed according to this invention and comprising four conductors there is attained a higher agreement between the damping values of, on the one hand, the phantom circuit and, on the other, each of the two pair circuits in comparison with the prior art cables.

Especially, in groups containing an odd number of conductors the cross-talk is eliminated.

Finally, it is possible, during the process of manufacture, continuously or intermittently to supervise and control the cross-talk existing within any group or cable, respectively.

I claim:
1. An electric line comprising at least one group of at least three conductors in which the position of each of said conductors varies essentially at random over at least a substantial length of said group, with respect to all other conductors in said group.

2. An electric line in accordance with claim 1 wherein the line includes at least three groups of conductors in which the position of each of said groups varies essentially at random over at least a substantial length of said line, with respect to all other groups in said line.

3. An electric line comprising at least three groups of conductors in which the position of each of said groups varies essentially at random over at least a substantial length of said line, with respect to all other groups in said line.

4. A method of manufacturing an electric line having at least one group of at least three conductors comprising combining said conductors into a group of conductors and, simultaneously with said combining, changing the relative position of each of said conductors essentially at random for at least a substantial period of time during said combining of said conductors, with respect to all other conductors in said group.

5. A method in accordance with claim 4 wherein the conductors are twisted during the step of combining said conductors.

6. A method in accordance with claim 4 wherein the combined group of conductors is wound on a drum and said combined group of conductors is twisted during the step of winding said group on said drum.

7. A method in accordance with claim 4 wherein the conductors are twisted during the step of combining said conductors, the combined group of conductors is wound on a drum and said combined group of conductors is twisted during the step of winding said group on said drum.

8. A method in accordance with claim 4 wherein the random changing of the positions of at least two of the conductors is interrupted and said at least two conductors are maintained in fixed relative positions with respect to each other for a period of time during the combining of said conductors sufficient to significantly reduce an unbalanced condition detected in the group containing said at least two conductors.

9. A method in accordance with claim 8 wherein the unbalanced condition is capacitance.

10. A method in accordance with claim 4 wherein the line includes at least three groups of conductors, said groups of conductors are combined into said line and, simultaneously with said combining, changing the relative position of each of said groups essentially at random for at least a substantial period of time during said combining of said groups, with respect to all other groups in said line.

11. A method in accordance with claim 10 wherein the groups are twisted during the step of combining said groups.

12. A method in accordance with claim 10 wherein the line is wound on a drum and said line is twisted during the step of winding said line on said drum.

13. A method in accordance with claim 10 wherein the groups are twisted during the step of combining said groups, the line is wound on a drum and said line is twisted during the step of winding said line on said drum.

14. A method in accordance with claim 10 wherein the random changing of the positions of at least two of the conductors is interrupted and said at least two conductors are maintained in fixed relative positions with respect to each other for a period of time, during the combining of said conductors, sufficient to significantly reduce an unbalanced condition detected in the group containing said at least two conductors.

15. A method in accordance with claim 14 wherein the unbalanced condition is capacitance.

16. A method in accordance with claim 10 wherein the random changing of the positions of at least two of the groups is interrupted and said at least two groups are maintained in fixed relative positions with respect to each other for a period of time, during the combining of said groups, sufficient to significantly reduce an unbalanced condition detected in the line containing said at least two groups.

17. A method in accordance with claim 16 wherein the unbalanced condition is capacitance.

18. A method of manufacturing an electric line having at least three groups of conductors comprising combining said groups into a line and, simultaneously with said combining, changing the relative position of each of said groups essentially at random for at least a substantial period of time during said combining of said groups, with respect to all other groups in said line.

19. A method in accordance with claim 18 wherein the groups are twisted during the step of combining said groups.

20. A method in accordance with claim 18 wherein the line is wound on a drum and said line is twisted during the step of winding said line on said drum.

21. A method in accordance with claim 18 wherein the groups are twisted during the step of combining said groups, the line is wound on a drum and said line is twisted during the step of winding said line on said drum.

22. A method in accordance with claim 18 wherein the random changing of the positions of at least two of the groups is interrupted and said at least two groups are maintained in fixed relative positions with respect to each other for a period of time, during the combining of said groups, sufficient to significantly reduce an unbalanced condition detected in the line containing said at least two groups.

23. A method in accordance with claim 22 wherein the unbalanced condition is capacitance.

References Cited

UNITED STATES PATENTS

| | | | |
|---|---|---|---|
| 2,869,316 | 1/1959 | Lilly | 174—34 X |
| 2,956,102 | 10/1960 | Lilly | 174—34 |
| 3,017,450 | 1/1962 | Crosby et al. | 174—34 |

DARRELL L. CLAY, *Primary Examiner.*

LEWIS H. MYERS, *Examiner.*

H. HUBERFELD, *Assistant Examiner.*